No. 880,750. PATENTED MAR. 3, 1908.
S. OTIS.
DUMP CAR.
APPLICATION FILED APR. 20, 1906.
2 SHEETS—SHEET 2.
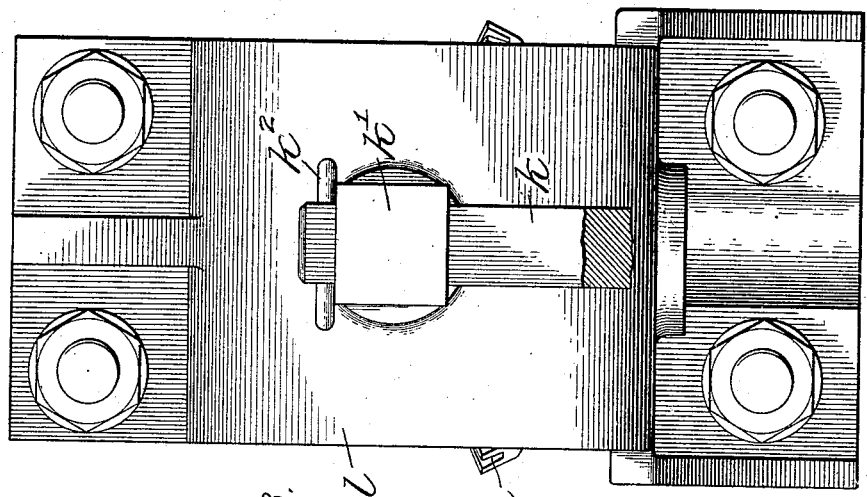
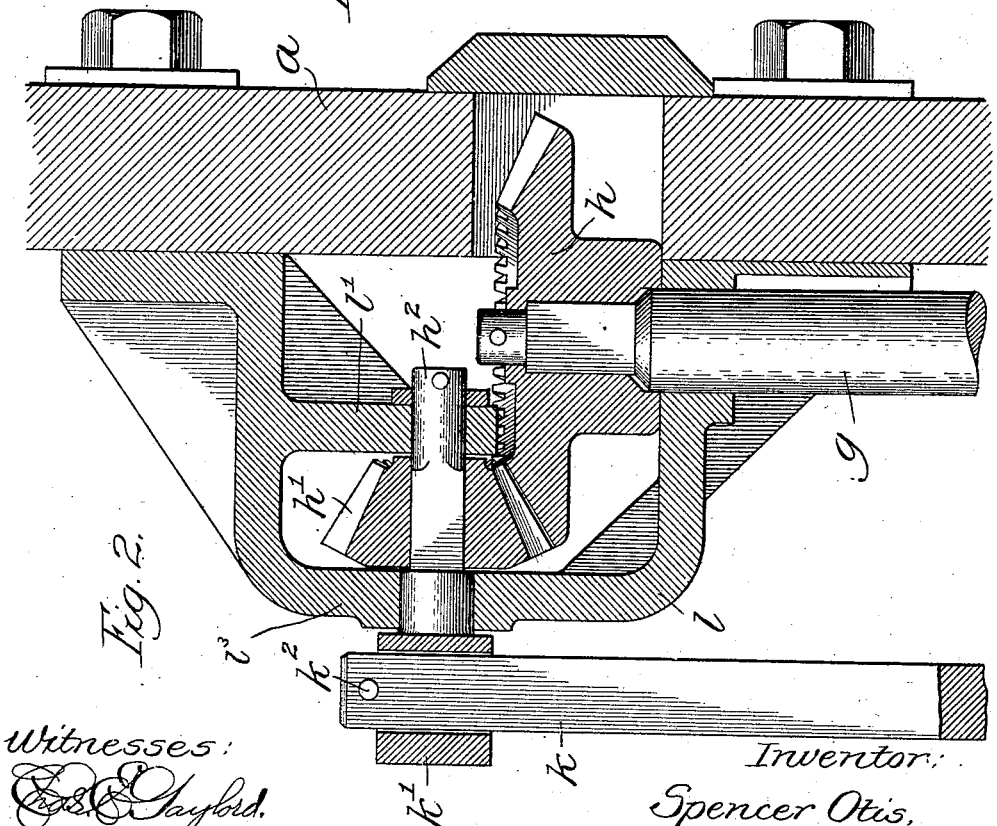
Witnesses:
Geo. E. Gaylord.
John Enders.
Inventor:
Spencer Otis,
By Thomas F. Sheridan,
Atty.
THE NORRIS PETERS CO., WASHINGTON, D. C.

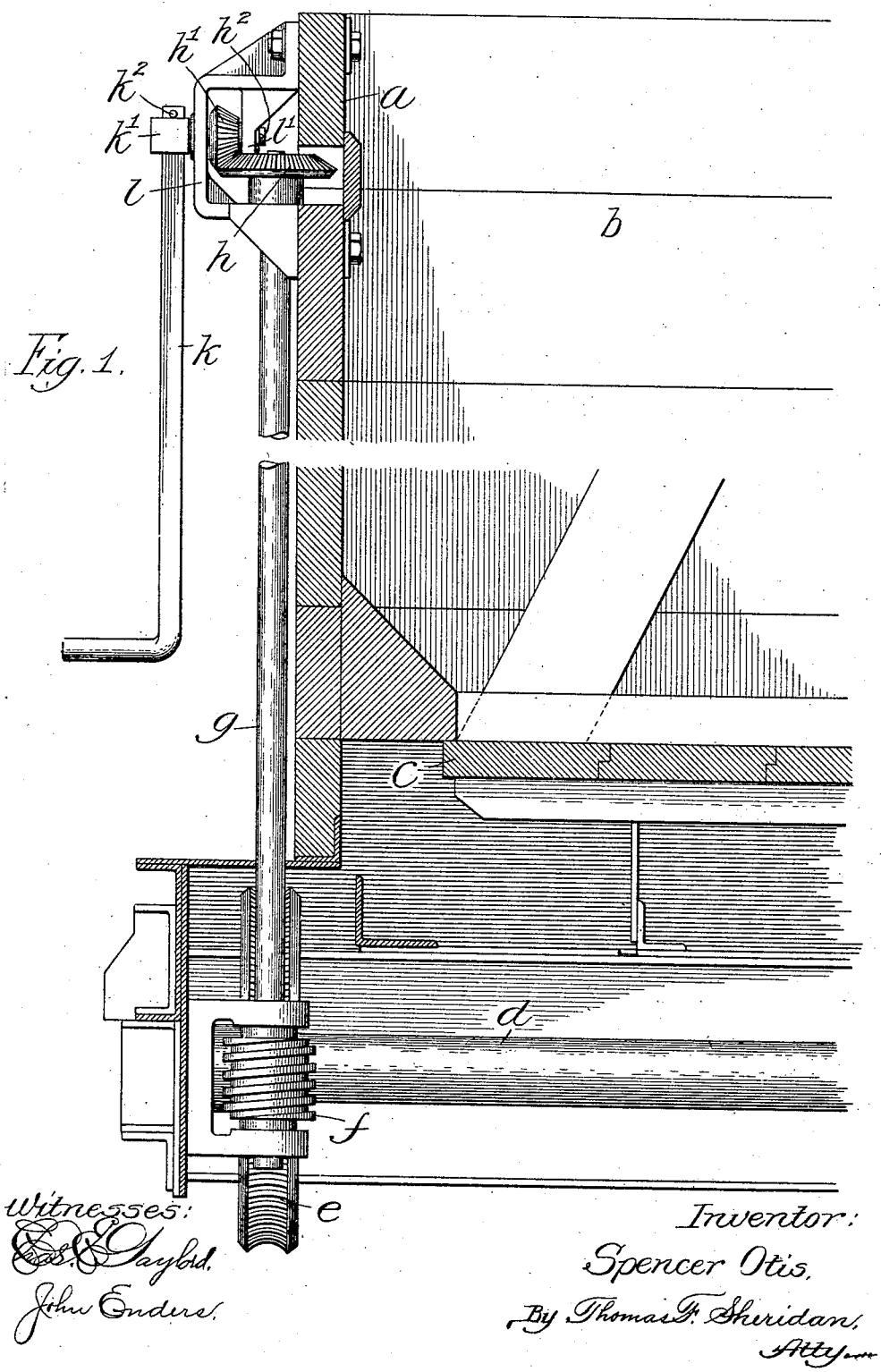

UNITED STATES PATENT OFFICE.

SPENCER OTIS, OF CHICAGO, ILLINOIS.

DUMP-CAR.

No. 880,750.　　　　Specification of Letters Patent.　　　Patented March 3, 1908.

Application filed April 20, 1906. Serial No. 312,816.

*To all whom it may concern:*

Be it known that I, SPENCER OTIS, a citizen of the United States, residing at Chicago, in the county of Cook and State of Illinois, have invented certain new and useful Improvements in Dump-Cars, of which the following is a specification.

My invention relates to dump cars having a bottom comprising a dumping door; and has for its object to provide an improved means for operating the dumping doors.

To this end my invention consists in the combinations and details hereinafter described and claimed.

In the accompanying drawings—Figure 1 is a side elevation, partly in section, showing the end portion of a dump car and the operating mechanism for the dumping doors. Fig. 2 is an enlarged sectional detail, showing a part of the operating mechanism. Fig. 3 is an end elevation of the parts shown in Fig. 2.

In the drawings $a$ represents the end portion of a dump car, $b$ the side and $c$ a dumping door forming part of the bottom, all as is usual and well-known.

$d$ represents an operating shaft connected to the dumping doors to operate the same as it is turned.

$e$ represents a worm wheel secured to the operating shaft $d$ near one end thereof. This worm wheel is engaged by the worm $f$ mounted upon a shaft $g$, this shaft $g$ being turned through the medium of the bevel gears $h$, $h'$, $h$ being secured to the shaft $g$, and $h'$ being secured to a short shaft $h^2$. The shaft $h^2$ is mounted in a housing $l$ secured to the end frame of the car, this housing being provided with an inner depending wall $l'$ through which the shaft $h^2$ passes, the bearings for this shaft being in the wall $l'$ and in the outer wall $l^3$ of the housing. The short shaft $h^2$ is provided at its outer end with a collar $k'$ through which is passed a crank arm $k$, a cross or cotter pin $k^2$ being passed through the crank arm near its end to prevent its withdrawal from the collar. This crank arm is loosely mounted in the collar, so that it may be adjusted longitudinally therein. When the crank arm is in position as shown in Fig. 1, the effective length thereof is greatest and the leverage secured thereby correspondingly great. The movement, however, is necessarily slower than when the shorter crank arm is used. If it be desired to operate the crank arm more rapidly, it may be slipped through the collar by the operator to any desired point, thus changing the leverage, and at the same time making it possible to rotate the crank at a higher speed. The advantages of a crank arm of this kind are obvious without specific description, it being possible to change the length of the crank arm, leverage and speed of rotation to suit varying conditions.

I claim:

1. A dump car having a dumping door, means for operating the dumping door, a collar forming a part of the operating means, and a longitudinally adjustable crank freely slidable in the collar.

2. A dump car having a dumping door, means for operating the door, comprising a rotatable shaft, a collar secured to the end of the shaft, a crank held in the collar and freely movable longitudinally therein, and means for preventing the withdrawal of the crank from the collar.

3. A dump car having a longitudinal operating shaft below the floor thereof, a worm wheel on the end of said shaft, a vertical shaft at the end of the car with a worm on its lower end engaging the said worm wheel, a short horizontal shaft near the upper end of said vertical shaft, bevel gears connecting the vertical shaft and the short horizontal shaft, a transverse sleeve on the short horizontal shaft, a crank adapted to slide through said sleeve, and means to prevent the said crank from leaving the sleeve while permitting it to slide freely therein.

4. A dump car having operating mechanism below the floor thereof, connecting mechanism extending thence to the outside end wall of the car, a short horizontal shaft adapted to actuate said connecting mechanism, a transverse sleeve on the said shaft, a crank adapted to slide through the said sleeve, and means to prevent the said crank from leaving the sleeve while permitting it to slide freely therein.

5. A dump car having door operating mechanism, a shaft adapted to actuate said door operating mechanism, a transverse sleeve on said shaft, a crank extending loosely through said sleeve, a handle on one end of said crank, and means at the opposite end thereof to prevent the crank from sliding out of the sleeve.

SPENCER OTIS.

Witnesses:
ANNA L. SAVOIE,
NORMAN A. STREET.